United States Patent
Horn et al.

(10) Patent No.: US 7,290,599 B2
(45) Date of Patent: Nov. 6, 2007

(54) SYSTEM FOR HEATING AND COOLING THE INTERIOR OF A MOTOR VEHICLE

(75) Inventors: Oliver Horn, Munich (DE);
Noureddine Khelifa, Munich (DE);
Steffen Korfmann, Graefelfing (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 10 days.

(21) Appl. No.: 11/381,243

(22) Filed: May 2, 2006

(65) Prior Publication Data

US 2006/0185837 A1    Aug. 24, 2006

Related U.S. Application Data

(62) Division of application No. 10/402,973, filed on Apr. 1, 2003, now Pat. No. 7,063,139.

(30) Foreign Application Priority Data

Sep. 20, 2002 (DE) ............... 102 43 764
Dec. 4, 2002 (DE) ............... 102 56 665

(51) Int. Cl.
*B60H 1/00* (2006.01)

(52) U.S. Cl. ............... 165/203; 165/240

(58) Field of Classification Search ........ 165/202, 165/203, 204, 42, 43, 44, 240; 237/12.3 R, 237/12.3 B; 62/159, 238.6, 238.7, 239, 244, 62/90, 93, 324.1, 324.6
See application file for complete search history.

(56) References Cited

U.S. PATENT DOCUMENTS

| | | | |
|---|---|---|---|
| 4,916,913 A | 4/1990 | Narikiyo | |
| 4,949,779 A | 8/1990 | Kenny et al. | |
| 5,388,421 A * | 2/1995 | Matsuoka | 62/324.6 |
| 5,641,016 A | 6/1997 | Isaji et al. | |
| 5,689,962 A | 11/1997 | Rafalovich | |
| 5,704,219 A * | 1/1998 | Suzuki et al. | 62/222 |
| 5,901,572 A | 5/1999 | Peiffer et al. | |
| 5,996,365 A | 12/1999 | Tanaka | |
| 6,047,770 A | 4/2000 | Suzuki et al. | |
| 6,237,351 B1 | 5/2001 | Itoh et al. | |
| 6,865,901 B2 | 3/2005 | Horn et al. | |
| 2002/0100290 A1 | 8/2002 | Herta et al. | |

FOREIGN PATENT DOCUMENTS

DE    42 14 703 A1    11/1993

\* cited by examiner

*Primary Examiner*—Ljiljana Ciric
(74) *Attorney, Agent, or Firm*—David S. Safran

(57) ABSTRACT

A system for heating and cooling the interior of a motor vehicle includes a first climate control device designed to heat or cool a front area of the interior, and a second climate control device designed to heat or cool a rear area of the interior. A first evaporator connectable to a first cooling agent circuit assigned to the first climate control device and a second evaporator is connectable to a second cooling agent circuit assigned to the second climate control device. The second evaporator is located in a latent storage in order to charge the latent storage with cold and the second climate control device contains a first heat exchanger designed to transfer the cold removed via a heat transfer medium circuit or the second cooling agent circuit from the latent storage for cooling the rear area of the interior by an air flow.

5 Claims, 4 Drawing Sheets

SYSTEM FOR HEATING AND COOLING THE INTERIOR OF A MOTOR VEHICLE

CROSS REFERENCE TO RELATED APPLICATION

This application is a divisional of commonly owned, U.S. patent application Ser. No. 10/402,973, filed Apr. 1, 2003 now U.S. Pat. No. 7,063,139.

BACKGROUND OF THE INVENTION

1. Field of the Invention

The invention relates to a system for heating and cooling the interior of a motor vehicle, including a first climate control device designed to heat or cool the front area of the interior, a second climate control device which is designed to heat or cool the rear area of the interior, a first evaporator which can be connected to a cooling circuit being assigned to the first climate control device and a second evaporator which can be connected to the cooling circuit being assigned to the second climate control device.

2. Description of Related Art

Generic systems for heating and cooling the interior of passenger vehicles are presently known and used, especially in the U.S. market. But the generic systems can also be used for climate control of drivers' cabs of commercial vehicles, especially in cabs which have a driver area, a passenger area, and a sleeping berth. In this case the first climate control device can be assigned to the driver and passenger area, while the second climate control device can be assigned to the sleeping berth. In the known systems, the first evaporator is conventionally located in a first climate control device, while the second evaporator is located in the second climate control device. The indicated climate control devices are also called climate control boxes or HVACs ("Heat Ventilation Air Condition").

SUMMARY OF THE INVENTION

Accordingly, one object of the present invention is to provide a system for heating and cooling the interior of a vehicle which includes auxiliary climate control at least in the rear area of the interior.

The above object, and other objects, are achieved by providing a system for heating and cooling the interior of a motor vehicle, comprising a first climate control device adapted to heat or cool the front area of the interior; a first cooling circuit connected to the first climate control device; a first evaporator connected to the first cooling agent circuit; a second climate control device adapted to heat or cool the rear area of the interior and including a first heat exchanger; a second cooling circuit connected to the second climate control device; and a latent storage connectable to the second cooling agent circuit. The latent storage includes a second evaporator adapted to charge the latent storage with cold. The first heat exchanger transfers the cold removed, via one of a heat transfer medium circuit and the second cooling agent circuit, from the latent storage for cooling of a rear area of the interior by an air flow.

The system of the present invention includes a second evaporator located in a latent storage in order to charge it with cold and, in the second climate control device, a first heat exchanger designed to transfer the cold removed via the heat transfer medium circuit or second cooling agent circuit from the latent storage for cooling of the rear area of the interior to an air flow. For example, in commercial vehicles, the system of the present invention makes it possible to cool the sleeping compartment or the sleeping berth both while driving and also at rest. The additional cost necessary for the approach of the present invention is comparatively low since the components assigned anyway to the second climate control device, such as for example a fan, air guides, controls and so forth, can continue to be used. There is preferably a first heat exchanger instead of the second evaporator which is ordinarily located in the second climate control device. The invention is not limited to use in conjunction with commercial vehicles, but can also be used in passenger vehicles. In this case, preferably additional measures are taken in order to enable auxiliary climate control of the front area of the interior. For example, in the first climate control device there can be another heat exchanger for this purpose which is likewise incorporated into the cooling agent circuit or which interacts with another latent storage.

In preferred embodiments of the system of the present invention, the first evaporator is located in the first climate control device. The first evaporator is preferably made such that it can transfer the cold which is released during evaporation to an air flow.

Preferably it is furthermore provided that in the first climate control device there is a heating heat exchanger which can be connected to a least one heat source or which is formed at least partially by it. The first heating heat exchanger can be connected in the conventional manner to the coolant circuit of an internal combustion engine. Optionally there can be auxiliary heating devices. Furthermore it is possible for the first heating heat exchanger itself to form a heat source, for example in the form of an electrical heating system.

In the above explained connection, it is furthermore preferably provided that a first fan located in the first climate control device is assigned to the first evaporator and the first heating heat exchanger. In this embodiment, it is preferred that the first heating heat exchanger is located downstream of the first evaporator relative to the air flow produced by the first fan, since in this case the air from which moisture has been removed by the first evaporator can optionally be heated in the desired manner.

In preferred embodiments of the system of the present invention, it is furthermore provided that in the second climate control device there is a second heating heat exchanger which can be connected to at least one heat source or is at least partially formed by it. The second heating heat exchanger can also be connected in a conventional manner to the coolant circuit of an internal combustion engine, and optionally there can be suitable auxiliary heating means. In particular, with respect to auxiliary climate control, it can however likewise be advantageous to operate the second heat source independently of the internal combustion engine. For this purpose, the second heating heat exchanger can be equipped, for example, with electrical heating means.

Preferably, it is furthermore provided that a second fan which is located in the second climate control device is assigned to the first heat exchanger and the second heating heat exchanger. In this case, it is advantageous for the above discussed reasons to arrange the second heating heat exchanger downstream of the first heat exchanger with respect to an air flow produced by the second fan.

Preferable embodiments of the system of the present invention include a second heat exchanger in the latent storage in order to transfer the cold stored in the latent storage to the cooling agent. The cooling agent can be, for example, sols. Regardless of the selected suitable cooling agent, the latent storage advantageously forms the interface between the compression refrigeration circuit and the cooling agent circuit. For all embodiments of the system of the present invention, it is preferred that a cooling agent pump is included.

Furthermore, it is preferably provided that a first expansion element and a first valve are assigned to the first evaporator. The first valve can be designed, for example, as a 2/2 valve and can be used to stop the evaporation of the cooling agent in the first evaporator, for example in the mode of operation in which only the latent storage is to be charged with cold.

Preferably it is similarly provided that a second expansion element and a second valve are assigned to the second evaporator. The second valve which is designed likewise, for example, as a 2/2 valve, is preferably designed to stop the evaporation of the cooling agent in the second evaporator, for example in a mode of operation in which only normal climate control system operation is to take place.

In one especially preferred embodiment of the system of the present invention, the first evaporator and the second evaporator are located parallel to a series connection of a compressor and a condenser.

One likewise especially preferred embodiment of the system of the present invention includes connection of the first heat exchanger to the heating circuit via a valve means. This approach can greatly simplify the structure of the second climate control device, since to heat the rear area of the interior there need not be a separate heating heat exchanger. In the simplest case, the second climate control device contains only the first heat exchanger and the second fan, the first heat exchanger being used both for cooling and also for heating. The valve means can comprise, for example, 2/2 valves and/or 3/2 valves, which are preferably solenoid valves. Of course it is likewise possible to use valves which have a different number of connections and/or of working positions.

In the above explained connection, it is furthermore preferred that the first heat exchanger can be connected via the valve means selectively to the second heat exchanger and/or heating circuit. The number of additionally requited lines is minimized by this approach.

One especially preferred embodiment of the system of the present invention includes the second heat exchanger being connected to the heating circuit via the valve means. In this embodiment, the latent storage can selectively store cold which is released on the second evaporator or heat supplied via the heating circuit and the second heat exchanger. Thus the second heat exchanger is used to remove the cold stored in the latent storage, for charging the latent storage with heat and for dissipating the heat stored in the latent storage. Regardless of whether heat or cold is stored in the latent storage, the discharge of the latent storage can take place without being limited thereto, especially in auxiliary operation of the system.

In the system of the present invention, it can furthermore be provided that the first heating heat exchanger can be connected via the valve means to the heating circuit. The valve means can be made such that heat is supplied via the heating circuit to the first heating heat exchanger and/or the first heat exchanger and/or the second heat exchanger in the scope desired at the time.

In addition, or alternatively, in the system of the present invention, it is provided that the first heating heat exchanger can be connected via the valve device to the second heat exchanger. This approach makes it possible for example to supply the heat stored in the latent storage to the first heating heat exchanger in auxiliary operation of the system in order to heat the front area of the interior. Furthermore, it is possible to use the first heating heat exchanger for another purpose and to supply to it with the cold removed from the latent storage in order to cool the front area of the interior, for example in auxiliary operation.

DETAILED DESCRIPTION OF THE INVENTION

Figure 1:
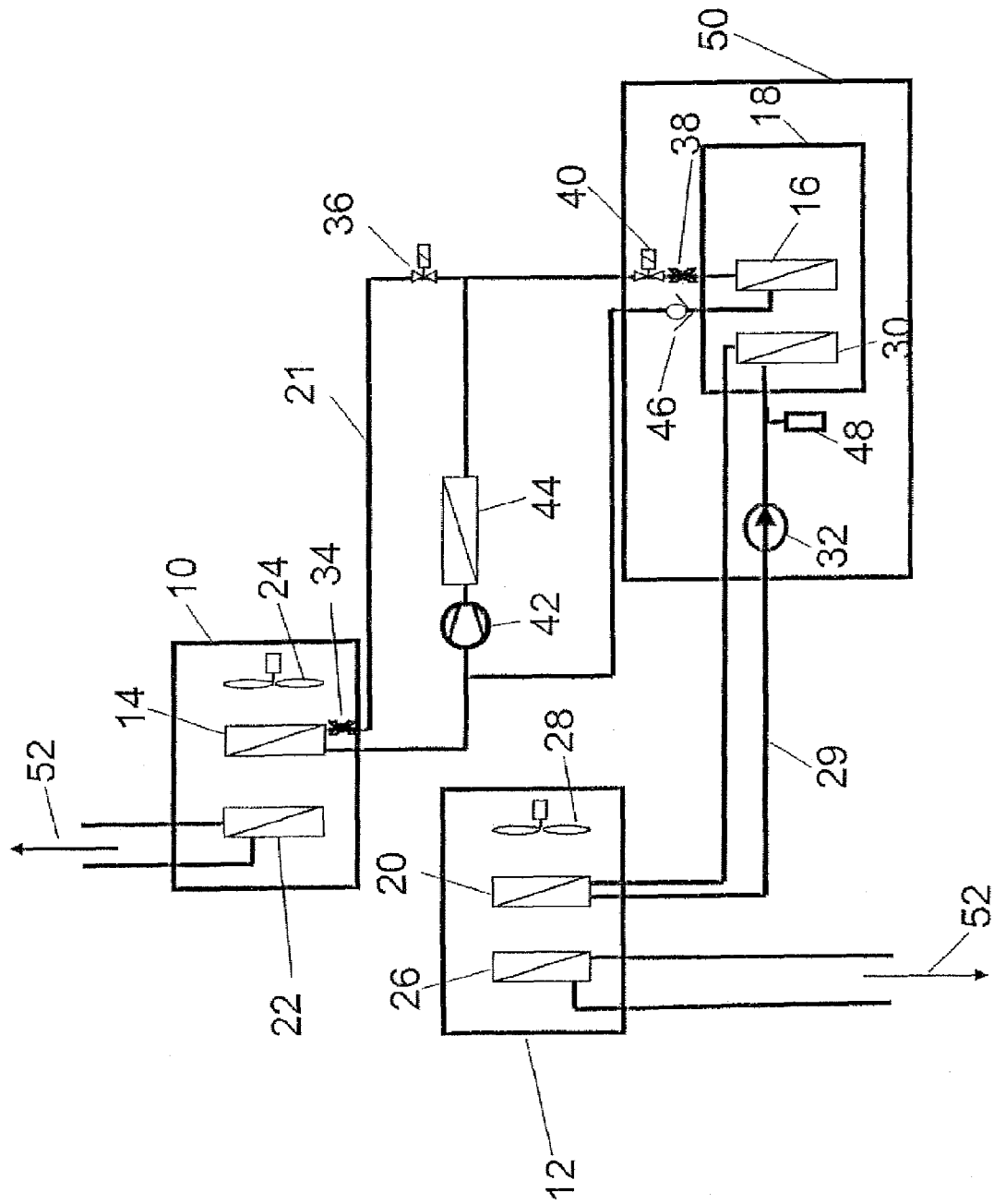
FIG. 1 shows a schematic of a first embodiment of the system of the present invention.

The system shown in FIG. 1 is designed for heating and cooling of the interior or the cab of a commercial vehicle. The compression refrigeration circuit of the system comprises a compressor 42 which can be mechanically driven by the engine of the vehicle. In the conventional manner, a condenser 44 is connected downstream of the compressor 42. A first HVAC module or a first climate control device 10 has a first heating heat exchanger 22 which is connected to the coolant circuit of the vehicle engine or to the heating circuit 52, as is likewise known in and of itself. Optionally, the first heating heat exchanger 22 can be equipped with, for example, an electrical auxiliary heater. A first cooling agent circuit 21 is connected to the first climate control device 10. The condenser 44 and compressor 42 are positioned along the first cooling agent circuit 21. In the first climate control device 10, there is furthermore a first evaporator 14 to which a first expansion element 34 is assigned. The first heating heat exchanger 22 and the first evaporator 14 are located in succession such that an air flow produced by the first fan 24 flows first through the first evaporator 14 or past it and then through the first heating heat exchanger 22 before it is supplied to the front area of the interior of the motor vehicle. The first climate control device 10 can be made for example in the form of a front box which is located in the front area of the vehicle. The first climate control device 10 is designed to control the climate in the driver and/or passenger area of the cab. The first evaporator 14 is connected parallel to the series connection of the compressor 42 and condenser 44, the first valve 36 being assigned to the first evaporator 14 and with it the coolant flow through the first evaporator 14 can be completely or partially stopped with the compressor 42 running.

A second HVAC module or a second climate control device 12 is located in the sleeping berth of the cab and contains a second heating heat exchanger 26, a first heat exchanger 20 and a second fan 28. The second heating heat exchanger 26, like the first heating heat exchanger 22, can be connected to the coolant circuit of the vehicle engine or to the heating circuit 52. In particular, with respect to auxiliary air conditioning or heating, embodiments are however also possible in which the second heating heat exchanger 26 is formed in addition or exclusively by an electrical or fuel-fired heating system or auxiliary heating system. Electrical heating systems or auxiliary heating systems can be used to special advantage if there is for example a fuel cell-operated APU (auxiliary power unit/auxiliary (electrical) power source). The second heating heat exchanger 26 and the first heat exchanger 20 are located in succession such that the air flow produced by a second fan 28 flows first through the first heat exchanger 20 and then through the second heating heat exchanger 26 before it is supplied to the sleeping berth. The first heat exchanger 20 is connected via a second cooling agent circuit 29 to a second heat exchanger 30 which is located in a latent storage 18 in which especially cold can be stored. The cooling agent can be for example sols and/or water and/or glycol, there being a cooling agent pump 32 for circulating the cooling agent. The cooling agent circuit furthermore comprises an equalization. tank 48. In the latent storage 18, there is a second evaporator 16 to which a second expansion element 38 is assigned. The second evaporator 16 is likewise connected in parallel to the series connection of the compressor 42 and the condenser 44. To the second evaporator 16, a second valve 40 is assigned with which coolant flow through the second evaporator 16 can be completely or partially prevented with the compressor 42 running. Furthermore, a check valve 46, the operation of which will be detailed below, is assigned to the second evaporator 16. The latent storage 18 is charged by the cold which is released during the evaporation process on the second evaporator 16. The cold stored in the latent storage 18 can be transferred, with the cooling agent pump 32 running, at least in part from the second heat exchanger 30 to the cooling agent and from the latter via the first heat exchanger 20 to the air flow which is produced by the second fan 28.

In this embodiment the second valve 40, the check valve 46, the cooling agent pump 32, the equalization tank 48, and the latent storage 18 which contains the second evaporator 16, the second expansion element 38, and the second heat exchanger 30 are combined into an auxiliary air conditioning module 50.

Without being limited thereto, in the system shown in FIG. 1, there can be especially the operating modes explained below.

1. Conventional Air Conditioning Operation with the Engine Running

In this operating mode, the compressor 42 is turned on, the first valve 36 is opened, the second valve 40 is closed and the cooling agent pump 32 is turned off. In this way the coolant proceeding from the compressor 42 flows through the condenser 44, the first valve 36, the first expansion element 34, the first evaporator 14 and back to the compressor 42. In doing so, the check valve 46 prevents the coolant emerging from the first evaporator 14 from traveling to the second evaporator 16.

2. Air Conditioning Operation and Simultaneous Charging of the Latent Storage

In this operating mode the compressor 42 is turned on, the first valve 36 is opened, the second valve 40 is opened and the cooling agent pump 32 is turned off. Coolant proceeding from the compressor 42 flows through the condenser 44, the first valve 36, the first expansion element 34, the first evaporator 14 and back to the compressor 42. At the same time, the coolant emerging from the condenser 44 flows through the second valve 40, the second expansion element 38, the second evaporator 16, the check valve 46 and back to the compressor 42. While the cold which is released on the first evaporator 14 is used to cool the driver area and/or passenger area, the cold which is released on the second evaporator 16 is at least partially stored in the latent storage 18.

3. Exclusive Charging of the Latent Storage with the Engine Running

This operating mode corresponds to the 2nd operating mode with the exception that first valve 36 is closed so that no coolant flows through the first evaporator 14.

4. Auxiliary Climate Control with the Engine Off

In this operating mode, the compressor 42 is not driven, i.e. no coolant circulates. The cold stored in the latent storage 18 can be used, for example, at night via the cooling agent circuit and the second climate control device 12 for cooling the sleeping berth. For this purpose the electrical cooling agent pump 32 is turned on, so that the cooling agent medium, for example sols, circulates between the first heat exchanger 20 and the second heat exchanger 30. Here the cold stored in the latent storage 18 is transferred from the second heat exchanger 30 to the cooling agent and from the latter via the first heat exchanger 20 to the air flow which has been produced by the second fan 28 and which is supplied to the sleeping berth.

It is clear to one skilled in the art that in addition to the above explained operating modes there can be other operating modes, for example operating modes for heating operation. Furthermore it is also possible to cool the sleeping berth with the vehicle engine running, especially during charging of the latent storage 18, via the second climate control device 12. At the same time, the first climate control device 10 can also optionally be active.

Figure 2:
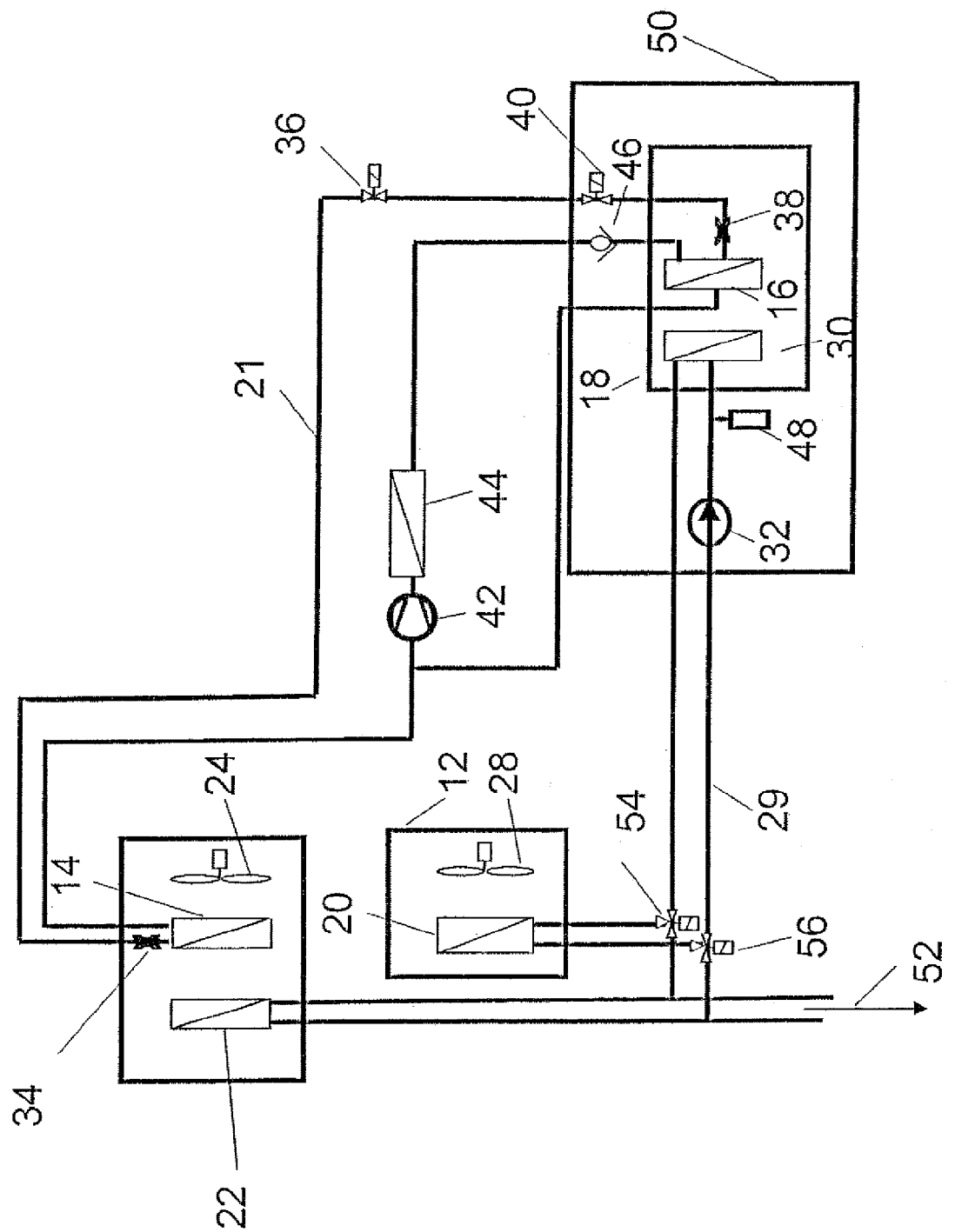
FIG. 2 shows a schematic of a second embodiment of the system of the present invention.

The second embodiment of the system of the present invention shown in FIG. 2 corresponds in many aspects to the embodiment as shown in FIG. 1. To avoid repetition, reference is made here to the description of FIG. 1 and hereinafter only the differences are explained. The second embodiment of the system of the present invention as shown in FIG. 2 thus differs from the embodiment of FIG. 1 in that there is a valve means 54, 56 via which the first heat exchanger 20 can also be connected to the heating circuit 52 which can be formed, for example, by the coolant circuit of the vehicle engine. This approach makes it possible to eliminate the second heating heat exchanger 26 shown in FIG. 1 in the second climate control device 12 so that the structure of the second climate control device 12 can be simplified and made more economical in terms of space. The valve means shown in FIG. 2 comprises two 3/2 valves 54, 56 with which the first heat exchanger 20 can be connected either to the second heat exchanger 30 which is located in the latent storage 18 or the heating circuit 52.

In addition to the operating modes 1 to 4 which were explained in conjunction with FIG. 1, in particular there can be a 5th operating mode which is explained below in the system as shown in FIG. 2.

5. Heating Operation with the Engine Running

In this operating mode, heat is supplied via the heating circuit 52 both to the first heating heat exchanger 22 and also to the first heat exchanger 20. If valves 54, 56 are 2/3 valves, in the 5th operating mode, they preferably interrupt the connection of the first heat exchanger 20 to the second heat exchanger 30. If the valves 54, 56 can assume more than two operating positions, it is however likewise possible to charge the latent storage 18 in parallel with heat by coupling the second heat exchanger 30 likewise to the heating circuit 52.

Figure 3:
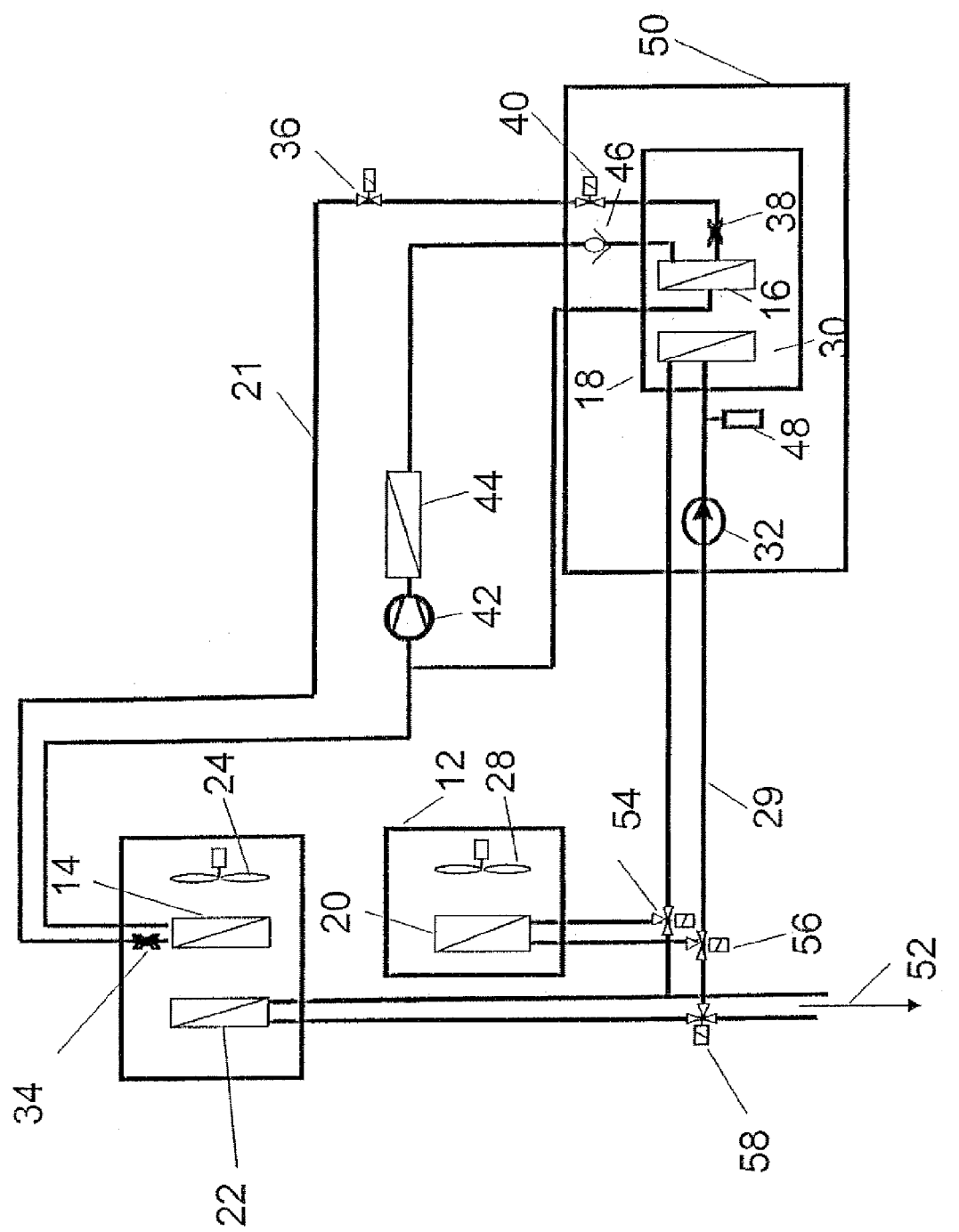
FIG. 3 shows a schematic of a third embodiment of the system of the present invention.

The third embodiment of the system of the present invention shown in FIG. 3 corresponds, with the exception of the difference explained below, to the embodiment shown in FIG. 2, for which reason reference is made to the corresponding description. The third embodiment of the system of the present invention as shown in FIG. 3 thus differs from the second embodiment as shown in FIG. 2 in that the valve means in addition to the 3/2 valves 54 and 56 comprises another 3/2 valve 58. The other 3/2 valve 58 in particular makes it possible to connect only the first heating heat exchanger 22 or only the first heat exchanger 20, or both the first heating heat exchanger 22 and also the first heat exchanger 20, to the heating circuit 52.

Figure 4:
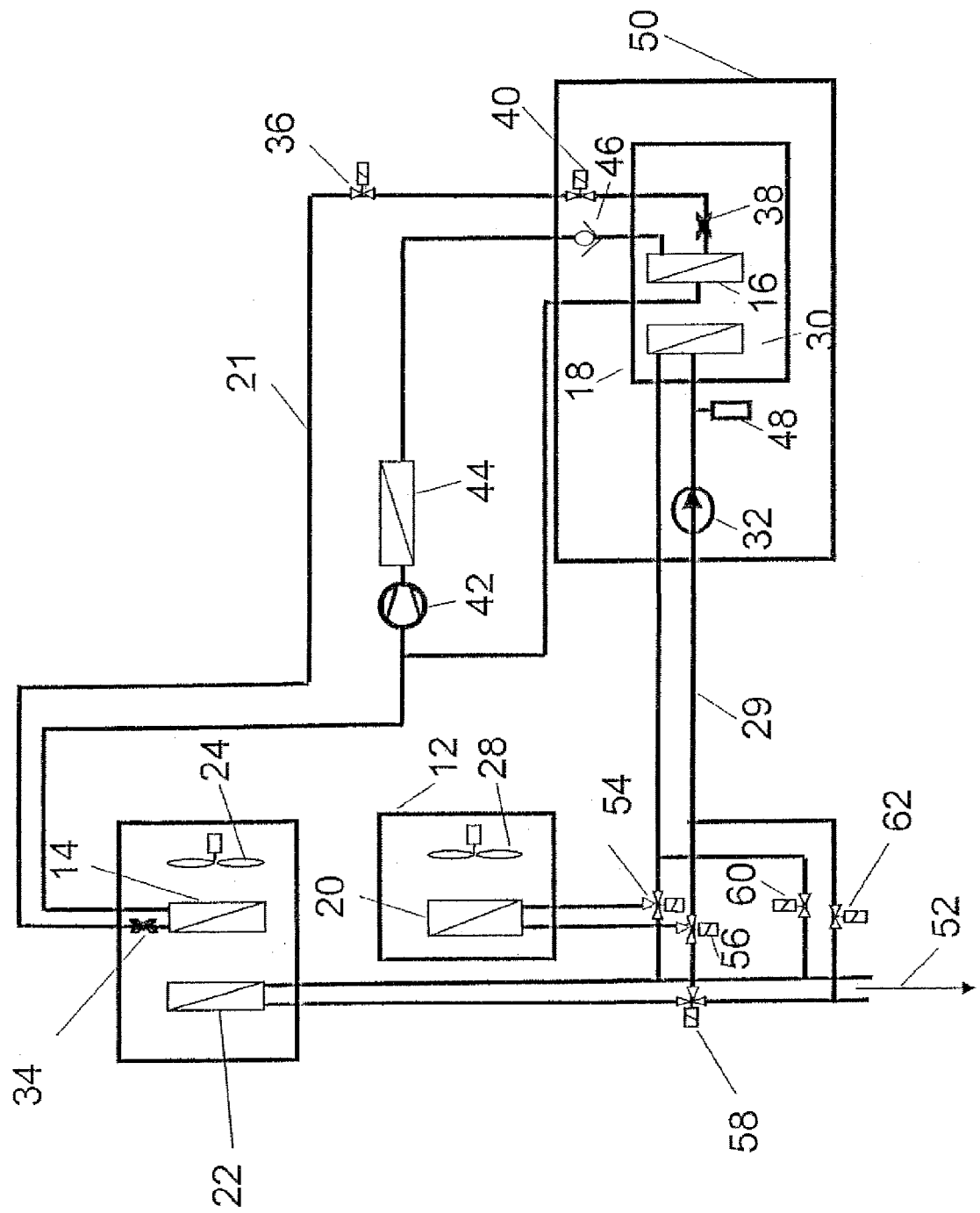
FIG. 4 shows a schematic of a fourth embodiment of the system of the present invention.

The fourth embodiment of the system of the present invention as shown in FIG. 4 corresponds to a development of the third embodiment as shown in FIG. 3, for which reason reference is made to the corresponding description. The fourth embodiment of the system of the present invention as shown in FIG. 4 differs from the embodiment as shown in FIG. 3 in that the valve means comprises two additional 2/2 valves 60 and 62. The 2/2 valves 60 and 62 make it possible for the second heat exchanger 30 which is provided in the latent storage 18, independently of the first heat exchanger 20 and the first heating heat exchanger 22, to be connected to the heating circuit 52 in order to charge the latent storage 18 with heat.

In addition to the above explained operating modes 1 to 5, in the system shown in FIG. 4, there can be especially the other operating modes explained below.

6. Exclusive Charging of the Latent Storage with Heat with the Engine Running

In this operating mode, with the exception of the valves 60 and 62, all valves are closed so that only the second heat exchanger 30 is connected to the heating circuit 52 in order to charge the latent storage 18 with heat.

7. Dissipation of the Heat Stored in the Latent Storage

This operating mode can be provided especially for auxiliary operation of the system of the present invention. In this mode, the 2/2 valves 60 and 62 are closed and the 3/2 valves 54 and 56 preferably assume an operating position in which only the first heat exchanger 20 is connected to the second heat exchanger 30 so that the heat dissipated from the latent storage 18 can be transferred to an air flow produced by the second fan 28 for heating of the rear area of the interior by means of the first heat exchanger 20.

It is clear to one skilled in the art that even with the systems as shown in FIGS. 2 to 4, other operating modes which are not explained above can be implemented, for example, by combining the operating positions of the valves shown in a different way or by using valves with more than the explained operating positions.

The features of the invention disclosed in the aforementioned description, in the drawings and in the claims can be important both individually and also in any combination for implementation of the invention.

We claim:

1. A system for heating and cooling the interior of a motor vehicle, comprising:
   a first climate control device adapted to heat or cool the front area of the interior;
   a first cooling agent circuit connected to said first climate control device;
   a first evaporator connected to said first cooling agent circuit;
   a second climate control device adapted to heat or cool a rear area of the interior and including a first heat exchanger;
   a second cooling agent circuit connected to said second climate control device;
   a latent storage connectable to said second cooling agent circuit and including a second evaporator adapted to charge said latent storage with cold; wherein said first heat exchanger transfers the cold removed, via one of a heat transfer medium circuit and said second cooling agent circuit, from said latent storage for cooling of a rear area of the interior by an air flow;
   wherein the first heat exchanger is connectable via a valve means to a heating circuit.

2. The system of claim 1, wherein the first heat exchanger is selectively connectable via the valve means to at least one of the second heat exchanger and the heating circuit.

3. The system of claim 1, wherein the second heat exchanger is connectable via the valve means to the heating circuit.

4. The system of claim 1, wherein the first heating heat exchanger is connectable via the valve means to the heating circuit.

5. The system of claim 1, wherein the first heating heat exchanger is connectable via the valve means to the second heat exchanger.

* * * * *